United States Patent
Henry et al.

(10) Patent No.: US 11,129,125 B1
(45) Date of Patent: Sep. 21, 2021

(54) COORDINATED RADIO FINE TIME MEASUREMENT

(71) Applicant: Cisco Technology, Inc., San Jose, CA (US)

(72) Inventors: Jerome Henry, Pittsboro, NC (US); Matthew A. Silverman, Shaker Heights, OH (US); John M. Swartz, Lithia, FL (US); Vishal S. Desai, San Jose, CA (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/812,004

(22) Filed: Mar. 6, 2020

(51) Int. Cl.
*H04W 48/20* (2009.01)
*H04W 64/00* (2009.01)
*G01S 13/74* (2006.01)

(52) U.S. Cl.
CPC ............. *H04W 64/00* (2013.01); *G01S 13/74* (2013.01)

(58) Field of Classification Search
CPC ...... H04W 64/00; H04W 4/023; H04W 4/027
See application file for complete search history.

(56) References Cited

U.S. PATENT DOCUMENTS 10,349,214 B2  7/2019  Sen et al.
10,459,065 B2  10/2019  Georgiou et al.
2016/0334498 A1  11/2016  Jamieson et al.
2017/0086086 A1*  3/2017  Bhatia ................. H04W 72/005
2018/0242107 A1*  8/2018  Sen ....................... H04W 64/00
2019/0146052 A1  5/2019  Chiu et al.

OTHER PUBLICATIONS

Combain. (2020). About Wi-Fi positioning—Combain. [online] Available at: https://combain.com/about/about-positioning/wi-fi-positioning/ [Accessed Mar. 5, 2020].
Abhishek P (Qualcomm), et al., "Multi-Link Aggregation: Gain Analysis," May 2, 2019, IEEE 802.11-19/0764r0, 11pages.
Wook Bong Lee. Samsung, "Virtual BSS for Multi AP Coordination," Jul. 2019, IEEE 802.11-19/1019r0, 12 pages.

* cited by examiner

*Primary Examiner* — Michael T Vu
(74) *Attorney, Agent, or Firm* — Patterson + Shendan, LLP

(57) ABSTRACT

Coordinated radio fine time measurement is provided via sending, from a client device, a ranging request to a first radio; receiving a first response sent at a first time from the first radio over a first channel; receiving a second response sent at the first time from a second radio over a second channel; and calculating, based on times of flight for the first response and the second response, a location of the client device relative to the first radio and to the second radio. Coordinated radio fine time measurement is also proved via in response to receiving, at an Access Point (AP), a ranging request from a client device and determining to respond using multiple channels: sending, both at a first time, a first response from a first radio over a first channel a second response from a second radio over a different channel.

14 Claims, 6 Drawing Sheets

COORDINATED RADIO FINE TIME MEASUREMENT

TECHNICAL FIELD

Embodiments presented in this disclosure generally relate wireless network management. More specifically, embodiments disclosed herein provide for locating client devices relative to the Access Points (APs) providing a wireless network.

BACKGROUND

In a wireless network, the relative locations of the various client devices and Access Points (APs) can be used to determine which APs are associated with which client devices, the transmission powers to use for signals, the provision of localized services, and the like. Accordingly, network operators can employ various ranging techniques using various technologies to determine where individual devices are located relative to one another, and use the resulting location data to set various characteristics of the network. However, current ranging techniques can leave much to be desired when applied in an active network setting; consuming large amounts of bandwidth to return low-accuracy location determinations.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method, comprising: sending, from a client device, a ranging request to a first radio; receiving a first response sent at a first time from the first radio over a first channel; receiving a second response sent at the first time from a second radio over a second channel; and calculating, based on a first time of flight for receiving the first response from the first radio and a second time of flight for receiving the second response from the second radio, a location of the client device relative to the first radio and to the second radio.

One embodiment presented in this disclosure provides a method, comprising: in response to receiving, at an Access Point (AP), a ranging request from a client device, determining whether to respond using one channel or multiple channels; in response to determining to respond using multiple channels: sending a first ranging response at a first time from a first radio over a first channel; and sending a second response at the first time from a second radio over a second channel different from the first channel.

One embodiment presented in this disclosure provides a method, comprising: receiving a first ranging signal sent from a first access point (AP) via a first channel; receiving a second ranging signal sent from a second AP via a second channel, wherein the first AP and the second AP are coordinated to send the first ranging signal and the second ranging signal simultaneously; and determining, based on a first time of flight of the first ranging signal from the first AP to a client device and a second time of flight of the second ranging signal from the second AP to the client device, a location of the client device.

EXAMPLE EMBODIMENTS

The present disclosure provides for Fine Time Measurement (FTM) in wireless networks to locate client devices relative to the Access Points (APs) providing the wireless network. These relative locations can be coupled with the known location of the APs to position the client device in the environment. The device determining the location of the client device (either the client device itself or the APs in the network) uses a Time of Flight (ToF) and/or a Round Trip Delay measurement (via timestamps of when a request is transmitted versus received) and the speed of signal propagation to determine a relative distances between particular APs and the client device. In some embodiments, by coordinating when the ranging signals are sent from separate radios in the environment, the ranging signals can occupy less bandwidth and/or provide a more accurate determination of where the client device is located (e.g., due to experiencing the same environmental effects and the client device being located at the same instantaneous location) compared to ranging techniques that send ranging signals at different times.

Figure 1:
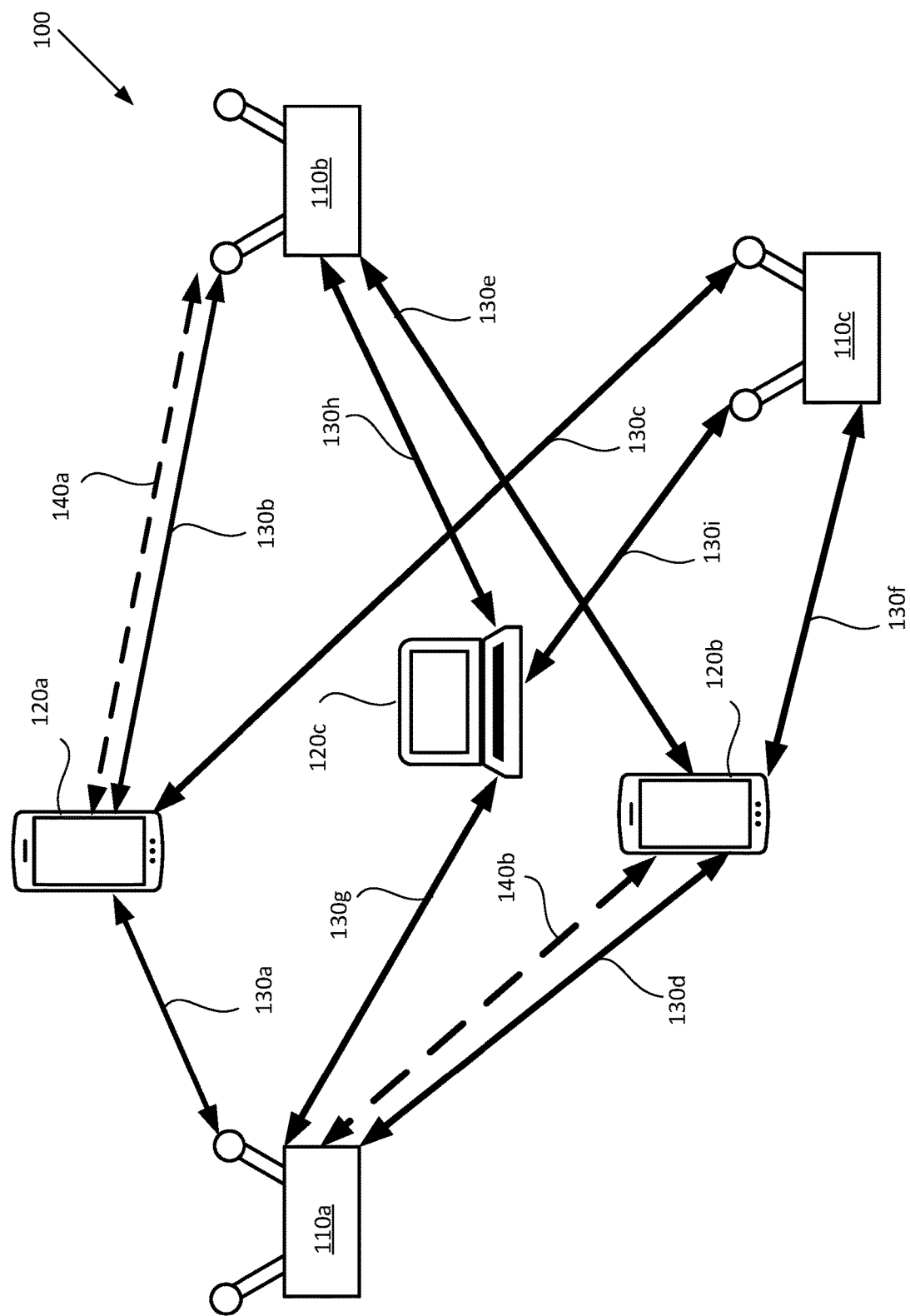
FIG. 1 illustrates an example network environment, according to embodiments of the present disclosure.

FIG. 1 illustrates an example network environment 100, according to embodiments of the present disclosure. Several APs 110a-c (generally, AP 110) provide network connectivity for various client devices 120a-c (generally, client device 120). Ranges 130a-i (generally, range 130) between the client devices 120 and the APs 110 are also illustrated for purposes of discussion.

An AP 110 may include various networking devices configured to provide wireless networks according to various networking standards or Radio Access Technologies (RAT) (e.g., IEEE 802.11 or "WiFi" networks, BLUETOOTH® networks, "cellular" (including various generations and subtypes thereof, such as Long Term Evolution (LTE) and Fifth Generation New Radio (5G NR)) networks, Citizens Broadband Radio Service (CBRS) networks, proprietary networks). Example hardware as may be included in an AP 110 is discussed in greater detail in regard to FIG. 6.

A client device 120 may include any computing device that is configured to wirelessly connect to one or more APs 110. Example client devices 120 can include, but are not limited to: smart phones, feature phones, tablet computers, laptop computers, desktop computers, Internet of Things (IoT) devices, and the like. Various standards may refer to a client device 120 as a client device, user equipment, mobile station (STA), or the like. Example hardware as may be included in a client device 120 is discussed in greater detail in regard to FIG. 6.

As shown in FIG. 1, the first client device 120a has established a first association 140a (generally, association 140) with the second AP 110b and is located at a first range 130a from the first AP 110a, a second range 130b from the second AP 110b, and a third range 130c from the third AP 110c. Similarly, the second client device 120b has established a second association 140b with the first AP 110a and is located at a fourth range 130d from the first AP 110a, a fifth range 130e from the second AP 110b, and a sixth range 130f from the third AP 110c. The third client device 120c has not established an association 140 with any of the APs 110, but is located at a seventh range 130g from the first AP 110a, an eighth range 130h from the second AP 110b, and a ninth range 130i from the third AP 110c. Each of the client devices 120a-c can request range determinations from one or more of the APs 110a-c and receive associated responses, regardless of whether the given client device 120 is associated with a given AP 110. Similarly, the client devices 120a-c can receive requests for range determines from one or more of the APs 110a-c and send associated responses, regardless of whether the given client device 120 is associated with a given AP 110.

Figure 2:
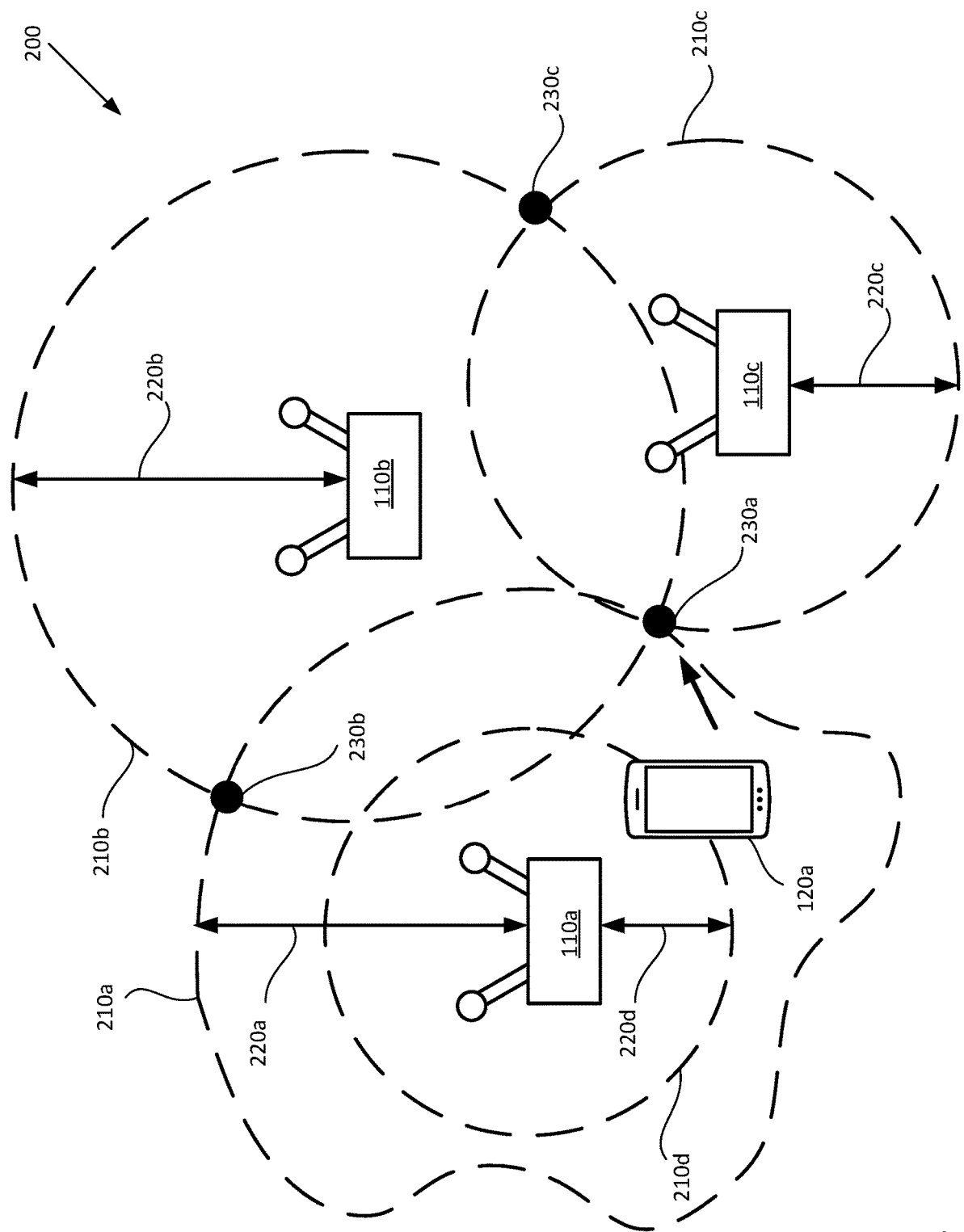
FIG. 2 illustrates isochronic ranging of the devices, according to embodiments of the present disclosure.

FIG. 2 illustrates isochronic ranging 200 of the devices, according to embodiments of the present disclosure. The ranging 200 illustrated in FIG. 2 shows perimeters 210a-d (generally, perimeter 210) of equal times-of-flight (ToF) 220a-d (generally, TOF 220) to/from an associated AP 110, and several perimeters 210 can be defined for a single AP 110 representing different TOFs 220. For example, a first perimeter 210a from the first AP 110a can represent a first TOF 220a of X milliseconds (ms) and a fourth perimeter 210d from the first AP 110 can represent a fourth TOF 220d of Y ms.

Although the second perimeter 210b, the third perimeter 210c, and the fourth perimeter 210d are illustrated as circular in FIG. 2, the first perimeter 210a is illustrated as having an irregular shape. Even shapes (e.g., circles) are the result of the propagation medium being the same (or similar) between the AP 110 and the perimeter 210, while uneven shapes can be due to intervening objects affecting the speed of signal propagation between the AP 110 and the perimeter 210. For example, a perimeter 210 may have an irregular shape due to walls, columns, trees, furniture, or other objects in some directions from the AP 110 slowing the signal's propagation compared to propagation through air in other directions. Accordingly, to account for uneven propagation, a network controller and/or AP 110 can map various perimeters 210 having known TOF 220 for signals for a given AP 110 to reach a given set of locations. For example, a client device receiving a signal with a TOF 220 of X ms can be located at any point along the first perimeter 210a, despite those points being located at different ranges 130 from the first AP 110a. It will be appreciated, however, that before the signals reach the obstructions, the TOF 220 may be even in all directions and define an evenly shaped perimeter 210 (e.g., the fourth perimeter 210d versus the first perimeter 210a).

The client device 120 can use TOFs 220 with multiple APs 110, or a network controller can use TOFs 220 from a client device 120 to multiple APs 110 to identify a location of the client device 120 in the environment. For example, the first TOF 220a from the first AP 110a indicates all of the locations that a signal reaches in X ms from the first AP 110a as a first perimeter 210a, the second TOF 220b from the second AP 110b indicates all of the locations that a signal reaches in Y ms from the second AP 110b as a second perimeter 210b, and the third range 130c from the third AP 110c indicates all of the that a signal reaches in Z ms from the third AP 110c as a third perimeter 210c. A first intersection 230a (generally, intersections 230) indicates a point X ms from the first AP 110a, Y ms from the second AP 110b, and Z ms from the third AP 110c. A second intersection 230b indicates a point X ms from the first AP 110a, Y ms from the second AP 110b, and not Z ms from the third AP 110c. A third intersection 230c indicates a point not X ms from the first AP 110a, Y ms from the second AP 110b, and Z ms from the third AP 110c. Accordingly, knowing that a first client device 120a is located X ms from the first AP 110a, Y ms from the second AP 110b, and Z ms from the third AP 110c, a device can locate the first client device 120a to be at the first intersection 230a.

APs 110 are deployed in the physical environment at known locations to provide wireless connective to various client devices 120, which may be static or mobile in the physical environment. In various embodiments, various assignment and balancing schema can cause a client device 120 to associate with a given AP 110 in the network environment 100. In various scenarios, a given client device 120 may associate with the AP 110 that is closest to the client device 120, offers the strongest signal strength, guarantees (or at least offers) a highest Quality of Service (QoS) level, etc. In some scenarios, a given client device 120 may associate with an AP 110 that is not closest to the client device 120, offers a weaker signal strength than another AP 110, or guarantees or offers a lower QoS level than another AP 110, etc. due to remaining associated with a formerly superior (but now inferior) AP 110, load balancing within the network environment (e.g., a first AP 110a may shift or handover associations to a second AP 110b when a difference in traffic demands or total associations between the two APs 110 reaches a threshold level), or when an individual device (or network controller) does not yet realize that an AP 110 with better operational characteristics is available to associate with the client device 120.

As described herein, the APs 110 are capable (either individually or as part of a virtual Basic Service Set (BSS) with other APs 110 providing a shared network) of operation in a multilink mode in which multiple radios (on one or more APs 110) send ranging signals on different channels at the same time.

The ranges 130 from the APs 110 to the client devices 120 are indicative of the distances between the devices, and are measured using on the ToF calculations, round trip delays, and/or locations on a perimeter 210 for requests to and responses from the APs 110. In some embodiments, a client device 120 (as an initiating station (ISTA)) transmits a ranging request to one or more APs 110 (whether associated or not), and the AP(s) 110 respond. The APs 110 on receipt of the request can determine when to respond and on which available channels. In some embodiments, a client device (as a receiving station (RSTA)) receives a ranging request from one or more APS 110, and the client device 120 responds. The requests and responses include timestamps (or other timing indications) that indicate when the individual devices transmit or receive the requests and responses, which are used, along with the speed of signal propagation to determine the distances between the client device 120 and the various APs 110 or a perimeter 210 mapped from the location of the AP 110.

The various APs 110 can change how the ranging signals (responses or requests) are sent to the client devices 120 based on the current networking conditions (including available bandwidth, signal to noise ratio (SNR), number of radios available in the APs 110, networking communications standard used, number of APs 110 in the environment, etc.) accuracy requirements of the client devices 120, power consumption, etc. In various embodiments, a FTM frame carried in the ranging signal includes one or more of: an identity of the transmitting device, a time of transmission, an identity of an intended receiving device, a location of the transmitting device (if known), a time of receipt and/or transmission of a ranging request (when the ranging signal is a ranging response), etc.

Figure 3:
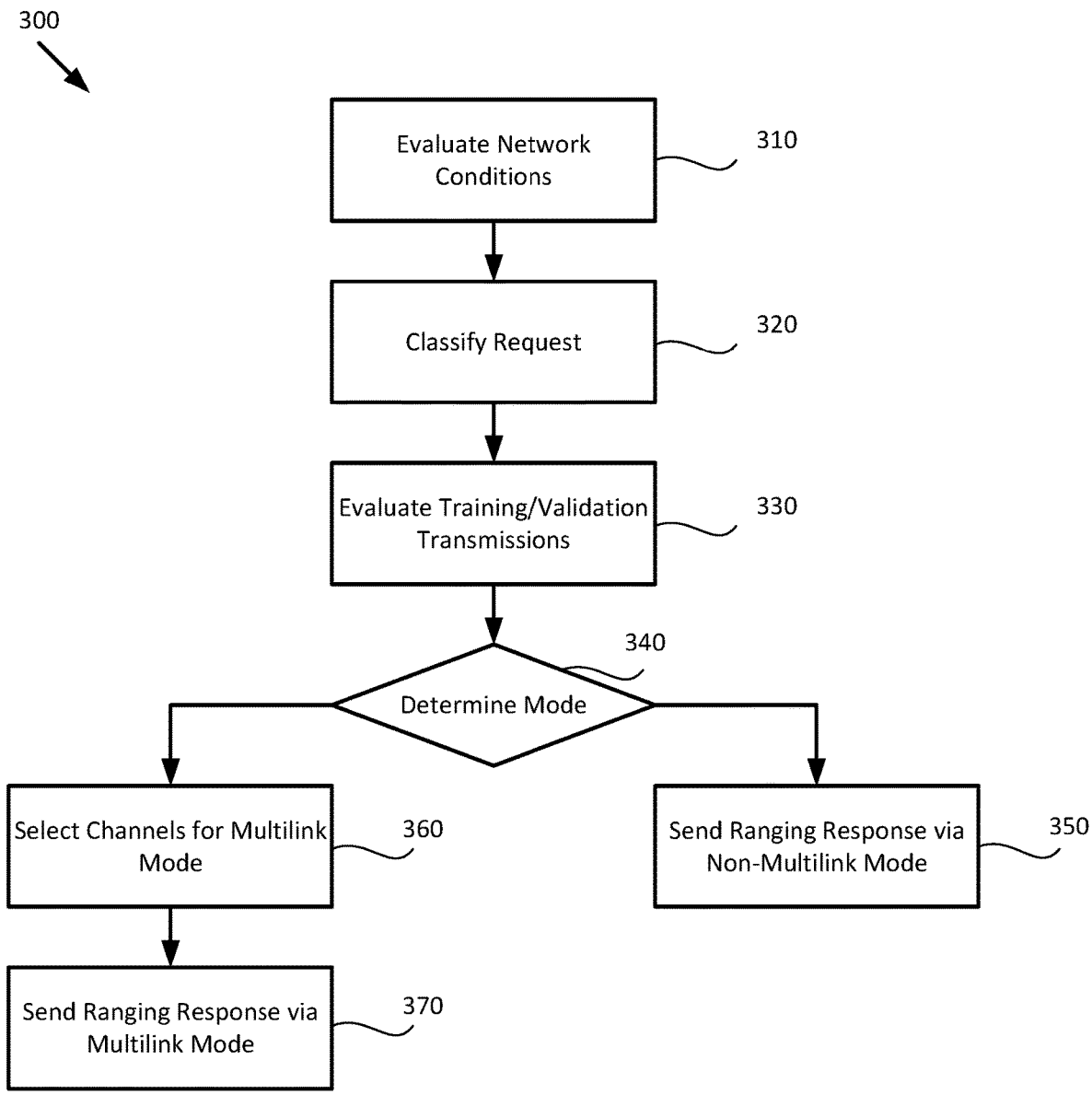
FIG. 3 is a flowchart of a method for responding to a ranging request from a client device by a given AP to offer improved ranging measurements to a client device, according to embodiments of the present disclosure.

FIG. 3 is a flowchart of a method 300 for responding to a ranging request from a client device 120 by a given AP 110 to offer improved ranging measurements to a client device 120, according to embodiments of the present disclosure.

Method 300 begins with block 310, where the AP 110 evaluates network conditions to determine whether to use multilink radio coordination in sending the ranging response. In some embodiments, the AP 110 uses a machine learning (ML) model to evaluate whether the network conditions indicate to coordinate radios in sending the ranging responses. The ML model may use a supervised training dataset (including the previous ranging requests and determined locations of client devices 120) and weight various channel conditions to determine whether to coordinate the ranging responses. (e.g., when the ML model has learned that a given AP 110 using 40 MHz (Megahertz) on the 5 GHz (Gigahertz) channel always results in greater than 4 m (meters) inaccuracy when the received signal strength indication (RSSI) for the client device 120 is below −55 dBm (decibel meters)). Thus, when the networking conditions are such (i.e., using 40 Mhz of bandwidth within the 5 GHz channel for an RSSI below −55 dBm) the ML model triggers the use of multilink mode, while other conditions will trigger use of non-multilink mode. Additionally, the ML model can learn if multilink mode enhances the accuracy of the location determination or would be a waste of resources (based on multilink determinations versus non-multilink determination triggers), thus adapting the multilink decision threshold.

At block 320, the AP 110 classifies the request from the client device 120 (and/or the client device 120) to evaluate whether to use multilink or non-multilink mode. For example, when the client device 120 is requesting a rough location (rather than a precise location), the AP 110 can classify the request to select the less bandwidth intensive mode to complete the ranging request (potentially providing the client device 120 with a more-accurate-than-requested range 130 if the more accurate mode uses less bandwidth). In some embodiments, the association status of the client device 120 in the network affects how the AP 110 classifies the request for evaluating the mode selection and/or channels used. For example an unassociated client device 120 may receive ranging responses via a single channel, a guest client devices 120 may receive a single 80 MHz 5 GHz link or dual links (e.g., two 20 MHz 2.5 GHz links or 40 MHz 5 GHz links), while enterprise or known devices receive multilink responses of at least 80 MHz.

At block 330, the AP 110 evaluates whether to use or not select a mode based on training or validation requirements in the network. For example, when networking conditions and the request classification indicate that the AP 110 should send a ranging response using a first mode, the AP 110 may instead select a second mode to verify the improvements offered by the first mode relative to the second mode, or to help build a training dataset. Stated differently, the AP 110 can determine to interleave multilink and non-multilink communications for comparison against one another for use in later determinations and evaluations, and these ranging signals are used as training signals. These comparisons between operational modes can be included in the training dataset for a ML model used to evaluate networking conditions (e.g., as used in block 310) so that a difference in accuracy of using a single response to determine a location of the client device 120 (e.g., non-multilink) versus using multiple responses sent over multiple channels (e.g., multilink) can be identified. For example, when using multilink communications versus non-multilink communication results in a difference above a precision threshold, the AP 110 may use multilink communications in future ranging response with similar networking conditions. Similarly, when using multilink communications versus non-multilink communication results in a difference below a precision threshold, the AP 110 may use non-multilink communications in future ranging response with similar networking conditions.

For example, to evaluate whether multilink communications can provide sufficiently more precise location determinations than non-multilink communications to justify the additional use of bandwidth associated with multilink mode, the AP 110 can use multilink mode when networking conditions otherwise call for non-multilink mode. Similarly, the AP 110 can use non-multilink mode when networking conditions otherwise call for multilink mode. In a further example, the AP 110 may evaluate whether multilink communications can reduce the amount of bandwidth used in locating a client device 120 (e.g., by reducing the number of requests/response in a high-noise environment).

At block 340 the AP 110 determines which mode to use based on the evaluations and classifications performed in block 310-330. The AP 110 endeavors to use as few resources as possible while still providing location exchanges with an accuracy sufficient for the needs of the client device 120 and the network as a whole. According, requests for ranging over narrow channels (e.g., 20 MHz or less) or channels with low SNRs may use multilink mode to reduce the risk of having to retransmit the ranging requests (e.g., per block 310), requests from prioritized devices may use multilink mode (e.g., per block 320), and requests from devices that are otherwise assigned to non-multilink mode may periodically use multilink mode (e.g., per block 330).

Method 300 proceeds to block 350 when the AP 110 determines to use non-multilink mode. In non-multilink mode, the AP 110 sends ranging responses to the client device 120 using a single radio and associated channel over several bursts, and potentially at several different times. For example, an AP 110 may use a first radio associated with a first channel to send a first portion of a ranging response to the client device and then use, at a later time, the first radio to transmit a second portion of the ranging response to the client device 120 over the first channel.

Method 300 proceeds to block 360 when the AP 110 determines to use multilink mode. In multilink mode, the AP 110 uses two (or more) radios included in the AP 110 to send ranging responses at the same time on different channels.

One potential advantage of multilink mode is that the two (or more) ranging signals sent from the corresponding radios of the AP 110 experience the same channel effects, and the receiving client device 120 is located at the same location (cf., a client device 120 being moved between receiving ranging signals sent at different times). Another potential advantage of multilink mode is that different channels used by the two (or more) radios offer more bandwidth than if any of the radios were used independently, thus allowing the ranging signals to use less time to transmit the same amount of data. A further potential advantage is that by sending data on different channels, interference confined to one of the channels does not affect the other channels, thus the ranging determination can be more resilient to environmental interference.

At block 360 the AP 110 determines selects which channels (and radios) to use when sending a ranging signal to the client device 120. In various embodiments, the AP 110 identifies the radios with Line of Sight (LOS) to the client device 120 and the associated channels for those radios (e.g., via mechanisms in IEEE 802.11az). In some embodiments, the AP 110 selects two (or more) channels that have similar interference characteristics, prioritizing the similar channels with the highest RSSIs. For example, the AP 110 identifies a first interference level on a first channel and a second interference level on a second channel and determines whether a difference in the interference levels satisfies an interference similarity threshold before selecting the first and second channels or a different set of channels with a more similar difference in interference levels.

In various embodiments, the AP 110 uses the previous selections of radios/channels to select the radios/channels to use in subsequent ranging determinations. For example, consider at a first time a first radio transmitting a first ranging signal on a first channel and a second radio transmitting a second ranging signal that is sent on a second channel. Continuing the example, when updating the location of the client device 120 at a later time, the first radio transmits a third ranging signal on the second channel and the second radio transmits a fourth ranging signal on the first channel. Accordingly, the AP 110 can cycle through or swap various radio: channel selections to ensure that ranging signals are sent by each of the radios using each of the available channels.

At block 370 the AP 110 sends ranging responses to the client device 120 using multiple radios and with multiple corresponding channels (e.g., selected per block 360). For example, an AP 110 may use a first radio associated with a first channel and a second radio associated with a second channel to send a ranging response to the client device 120 at a first time. As will be appreciated, because the AP 110 is using two (or more) channels at the same time, the same amount of data can be carried to the client device 120 in less time than if using a single channel, thus shortening the amount of time needed to transmit a ranging signal.

Figure 4:
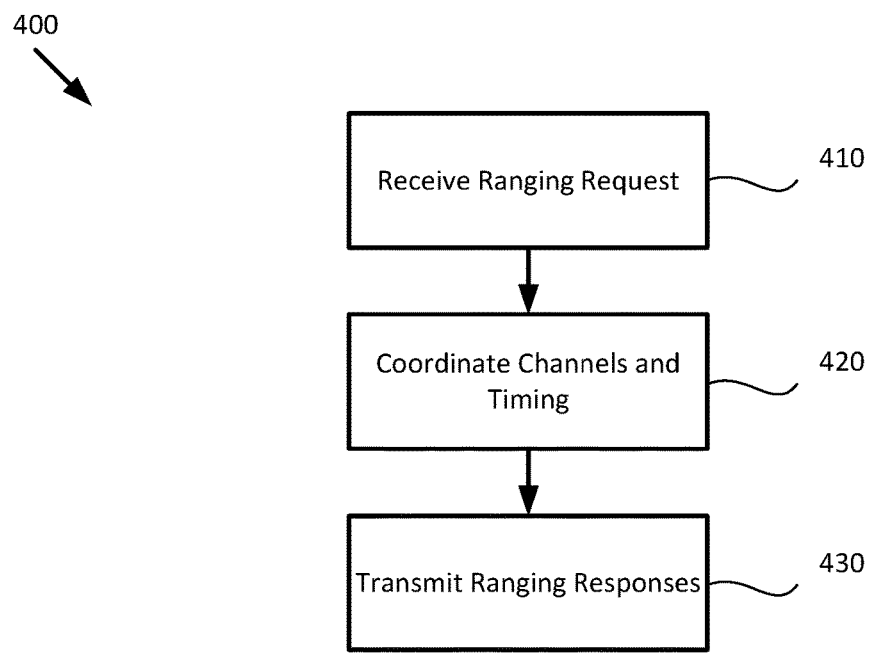
FIG. 4 is a flowchart of a method to coordinate several APs using multilink aggregation to determine the location of a client device in the physical environment, according to embodiments of the present disclosure.

FIG. 4 is a flowchart of a method 400 to coordinate several APs 110 using multilink aggregation to determine the location of a client device 120 in the physical environment, according to embodiments of the present disclosure.

Method 400 begins with block 410 in response to an AP 110 receiving a ranging request from a client device 120. When a given AP 110 in a network operating as a virtual Basic Service Set (BSS) receives a ranging request from a client device 120, the AP 110 (or a network controller) coordinates with neighboring APs 110 in the shared network to enable a dual ranging response. A dual ranging response involves two (or more) APs 110 that are located at different locations in the physical environment sending ranging signals at the same time At block 420 the network coordinates which neighboring APs 110 respond to the client device 120, and what channels each AP 110 uses for dual ranging and the time that the ranging response are to be sent. Each AP 110 uses a different channel to transmit at the same time, so that a client device 120 capable of receiving simultaneous range exchanges (e.g., via multiple receiving antennas) can do so.

In various embodiments, the APs 110 use a static mapping to determine which APs 110 use which radios to send ranging signals to the client device 120. Because the radios of the APs can be aimed and/or focused in various directions, the APs 110 may indicate which radios (and the associated frequencies) are available for dual ranging based on whether a given radio has LOS with the client device so that radios without LOS are deprioritized when coordinating the APs 110. For example, if a first AP 110a has a first radio with LOS to the client device 120 and a second radio without LOS to the client device, the first AP 110a coordinates with other APs 110 so that the first AP 110a preferentially uses the first radio (and not the second radio). After determining which radios have LOS to the client device 120, the APs 110 coordinate which radios to use so that the radios with the strongest Received Signal Strength Indication (RSSI) with the client device 120 are prioritized for use.

In various embodiments, the APs 110 use a dynamic mapping to determine which APs 110 use which radios to send ranging signals to the client device 120. Similarly to static mapping, in dynamic mapping, the radios (and associated frequencies) without LOS are excluded from use, and a schedule is created that uses the radios/channels with LOS. For example, when the first through third APs 110a-c each have three radios (with associated channels) available for multilink ranging, a schedule can indicate that: at time$_1$ AP$_1$ 110a uses channel$_1$, AP$_2$ 110b uses channel$_2$, and AP$_3$ 110c uses channel$_3$; at timet AP$_1$ 110a uses channel$_2$, AP$_2$ 110b uses channel$_3$, and AP$_3$ 110c uses channel$_1$; and at time$_3$ AP$_1$ 110a uses channel$_3$, AP$_2$ 110b uses channel$_1$, and AP$_3$ 110c uses channel$_2$. However, if the radio associated with channel$_1$ on AP$_1$ 110a does not have LOS to the client device 120, the schedule may instead be: at time$_1$ AP$_1$ 110a does not transmit, AP$_2$ 110b uses channel$_2$, and AP$_3$ 110c uses channel$_3$; at time$_2$ AP$_1$ 110a uses channel$_2$, AP$_2$ 110b uses channel$_3$, and AP$_3$ 110c uses channel$_1$; and at time$_3$ AP$_1$ 110a uses channel$_3$, AP$_2$ 110b uses channel$_1$, and AP$_3$ 110c uses channel$_2$. Stated differently, given the excluded radios without LOS, a schedule is created for bursts of ToF measurements where the APs 110 cycle through the various channels that do have LOS.

At block 430, the APs 110 transmit ranging signals according to the schedule/frequency mapping coordinated (according to block 420). Two or more APs 110 transmit ranging signals at the same time on the different assigned channels, and may transmit several bursts of ranging signals at different times using the same channels (e.g., a first AP 110a uses a first channel at time$_1$ and time$_2$ whereas a second AP 110b consistently uses a second channel at time$_1$ and time$_2$) or swapping channels according the schedule/frequency mapping (e.g., a first AP 110a uses a first channel at time$_1$ and a second channel at time$_2$ whereas a second AP 110b uses the second channel at time$_1$ and the first channel at time$_2$).

Figure 5:
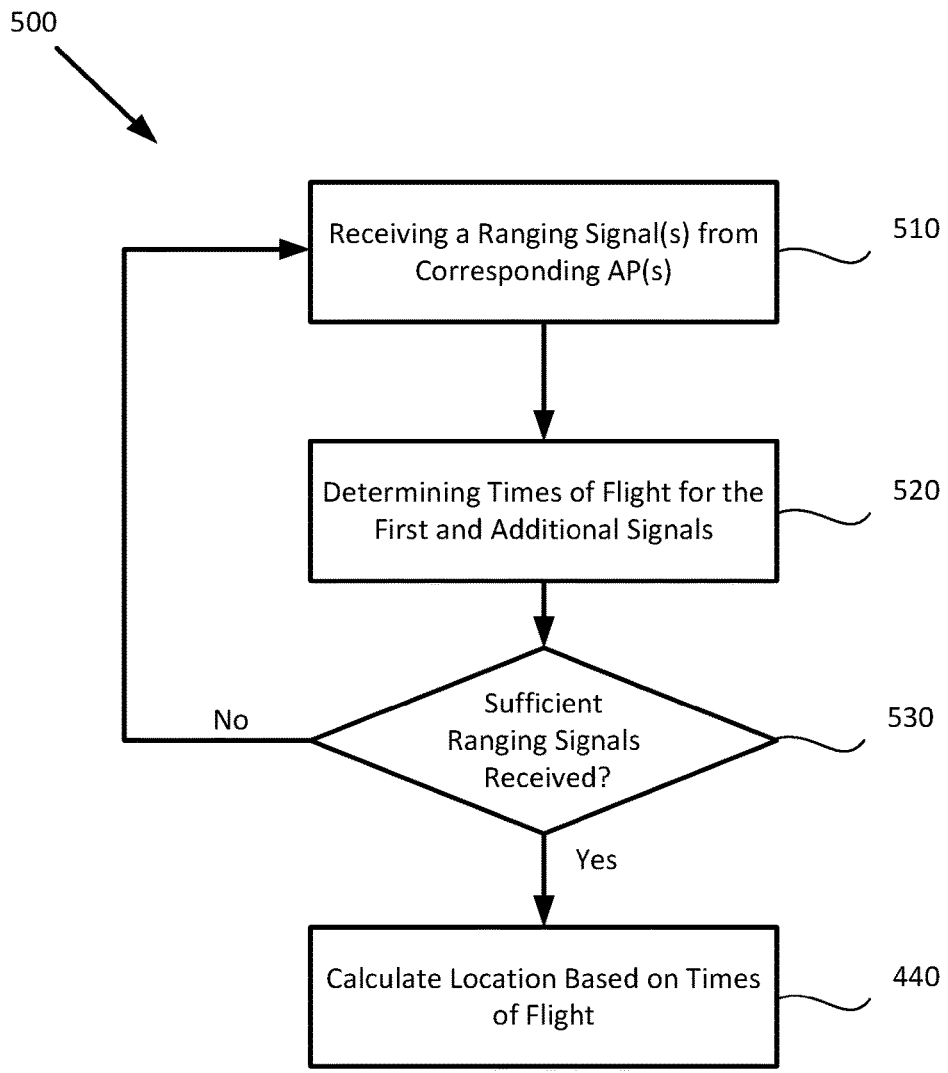
FIG. 5 is a flowchart of a method for passive location determination, according to embodiments of the present disclosure

FIG. 5 is a flowchart of a method 500 for passive location determination, according to embodiments of the present disclosure. In method 500, neither the APs 110 nor the client devices 120 actively request ranging signals, but instead the APs 110 transmit ranging signals (to one another) at coordinated times, so that a client device 120 receiving those ranging signals can identify a relative position based on hyperbolic intersection resolution.

Method 500 begins at block 510, where a client device 120 receives a ranging signal from a corresponding AP 110. For example, a first ranging signal from a first AP 110a, a second ranging signal from a second AP 110b, a third ranging signal from a third AP 110c, etc. The APs 110 coordinate to send the ranging signals at the same time, and may rely on a network controller or a master AP 110 to designate when to send the ranging signals, and what channels individual APs 110 use to send the ranging signals on.

The APs 110 coordinate when to exchange ranging signals, and depending on the number of APs 110 coordinating the exchange, may direct the FTM frames in different ways. For example, when two neighboring APs 110 (e.g., a first AP 110a and a second AP 110b) exchange ranging signals, both APs 110 send the ranging signals at the same time, although the client device 120 may receive the ranging signals at different times due to propagation speed of the ranging signals over different distances (or at the same time if equidistant from the two APs 110). In some embodiments, APs 110 transmitting ranging signals at the same coordinate what frequency bands to transmit the ranging signals in so that each transmitting AP 110 uses a different frequency band or bands (e.g., when using multilink communications) or so that each pair of APs 110 uses a single channel (although different pairs of APs 110 can use different channels at the same time).

Accordingly, by sending ranging signals at the same time rather than waiting to receive a ranging signal from another AP 110, the two APs 110 can use less airtime, and the ranging signals (e.g., $AP_1$-to-$AP_2$ and $AP_2$-to-$AP_1$) are affected by the same channel conditions in the environment. In various embodiments, the client device 120 can receive ranging signals sent from multiple pairs of APs 110 at the same time or sets of ranging signals sent at different times to identify the location of the client device 120. For example, when a first AP 110a is capable of using multilink transmission, the pair of a first AP 110a and a second AP 110b can use a first channel to send ranging signals to each other at a first time (e.g., $AP_1$-to-$AP_2$ and $AP_2$-to-$AP_1$ are sent at $time_1$ on $channel_1$) and the pair of the first AP 110a and a third AP 110c can use a second channel to send ranging signals to each other at the first time (e.g., $AP_1$-to-$AP_3$ and $AP_3$-to-$AP_1$ are sent at $time_1$ on $channel_2$).

In some embodiments, when three (or more) APs 110 exchange ranging signals, APs 110 send the ranging signals at the same time, but do not send paired ranging signals. Stated differently, a first AP 110a that sends a first ranging signal to a second AP 110b does not expect to receive a second ranging signal from the second AP 110b. Rather, the second AP 110b sends the second ranging signal to a third AP 110c, which sends a third ranging signal to the first AP 110a; forming a triplet. As will be appreciated, circuitous transmissions that involve four or more APs 110 transmitting FTM frames to one AP 110 and expecting to receive an FTM frame from a different AP 110 are also contemplated by the present disclosure. These ranging signals, similarly to the paired signal example, are transmitted from the respective APs 110 at the same time, and when a client device 120 has received at least three FTM frames, the client device 120 can make a location determination without waiting for further ranging signals.

At block 520, the client device 120 determines the TOF 220 for ranging signals received thus far. These TOF readings allow the client device 120 to determine a range 130 from a transmitting AP 110, which may include determining that the client device 120 is located on a perimeter 210 that defines a series of locations that are equidistant from the transmitting AP 110 based on the propagation speed of the ranging signal and how long the ranging signal took to arrive to that location. In various embodiments, the client device 120 determines the TOF 220 for a given ranging signal based on a time stamp or other known time of transmission for the ranging signal.

At block 530, the client device 120 determines whether at least three ranging signals have been received. The ranging signals that are received may all be sent at a first time (e.g., $AP_1$-to-$AP_2$, $AP_2$-to-$AP_3$, and $AP_3$-to-$AP_1$ all at $time_1$ or $AP_1$-to-$AP_2$, $AP_2$-to-$AP_1$, $AP_3$-to-$AP_1$, and $AP_1$-to-$AP_3$ all at $time_1$) and received at different times by the client device 120 or may be sent at different times (e.g., $AP_1$-to-$AP_2$ and $AP_2$-to-$AP_1$ at $time_1$ and $AP_1$-to-$AP_2$ and $AP_2$-to-$AP_1$ at $time_2$).

When the client device 120 has not yet received at least three ranging signals, method 500 returns to block 510, where the client device 120 waits to receive additional ranging signals. In various embodiments, due to differences in times of flight due to differences in distances from the client device 120 to the other APs 110, the ranging signals received at subsequent iterations of block 510 may be sent at the same time, or at different times (e.g., in a second burst from a given pair of APs 110.

When the client device has received at least three ranging signals, method 500 proceeds to block 540. At block 540, the client device 120 calculates its location based on the times of flight of the ranging signals from known locations of the transmitting APs 110 and a point of intersection 230 of the three ranges 130 determined from the times of flight. Method 500 may then conclude.

Figure 6:
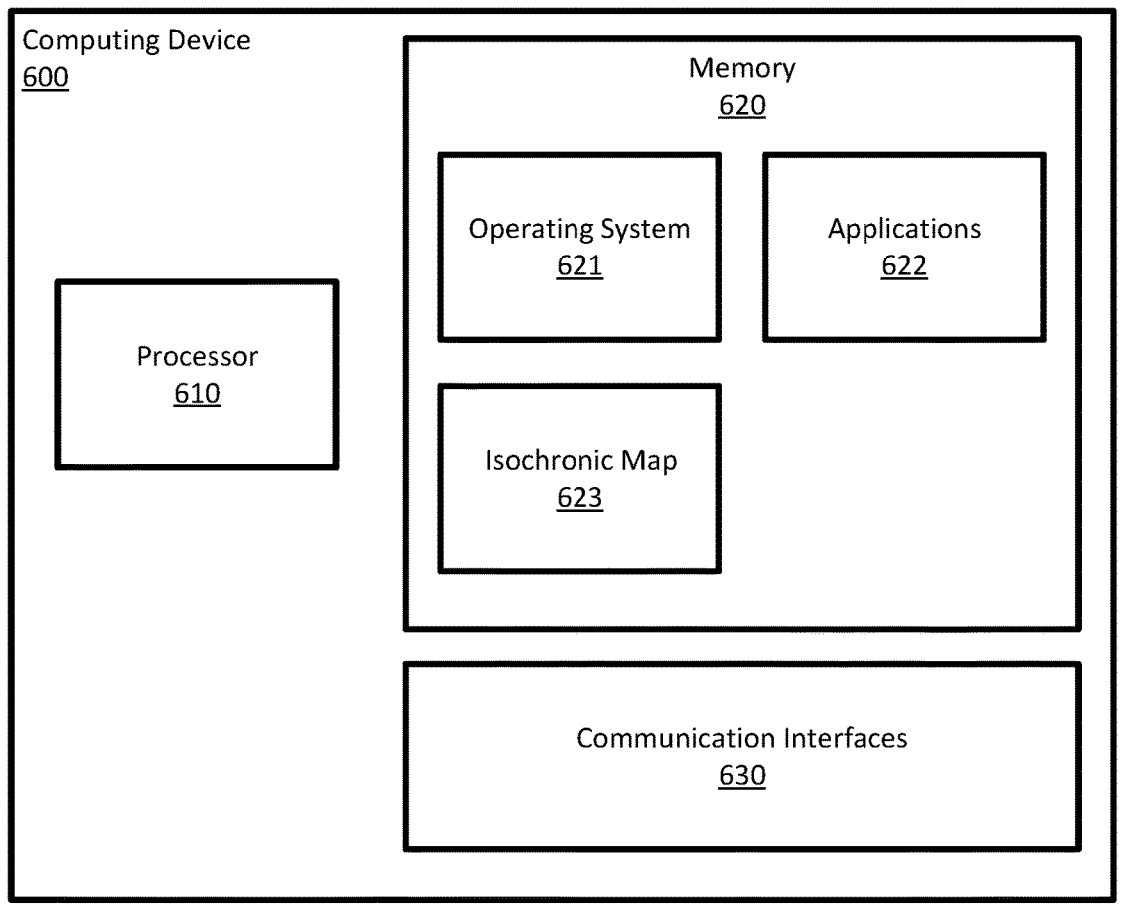
FIG. 6 illustrates hardware of a computing device, according to embodiments of the present disclosure.

FIG. 6 illustrates hardware of a computing device 600, as may be used in an AP 110 or a client device 120 described in the present disclosure. The computing device 600 includes a processor 610, a memory 620, and communication interfaces 630. The processor 610 may be any processing element capable of performing the functions described herein. The processor 610 represents a single processor, multiple processors, a processor with multiple cores, and combinations thereof. The communication interfaces 630 facilitate communications between the computing device 600 and other devices. The communications interfaces 630 are representative connectors and controllers for wireless communications antennas and various wired communication ports. In various embodiments the communications interfaces 630 may connect to and control several different antennas configured to transmit and receive signals at various wavelengths in various communications bands. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

As shown, the memory 620 includes various instructions that are executable by the processor 610 to provide an operating system 621 to manage various functions of the computing device 600 and one or more applications 622 to provide various functionalities to users of the computing device 600, which include one or more of the functions and functionalities described in the present disclosure. In various embodiments, the memory 620 includes isochronic maps 623 that indicate the locations in the environment associated with various TOFs 220 from a given AP 110 and/or known locations of the APs 110 in the environment to help locate client devices 120 according to embodiments described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
sending, from a client device, a ranging request to a first radio;
receiving a first response sent at a first time from the first radio over a first channel;
receiving a second response sent at the first time from a second radio over a second channel; and
calculating, based on a first time of flight for receiving the first response from the first radio and a second time of flight for receiving the second response from the sec- ond radio, a location of the client device relative to the first radio and to the second radio.

2. The method of claim 1, wherein the first radio and the second radio are included in one Access Point (AP).

3. The method of claim 1, wherein the first radio is included in a first AP and the second radio is included in a second AP, wherein the first AP and the second AP are part of a shared network, wherein the first AP and the second AP are located at different physical locations.

4. The method of claim 1, further comprising:
receiving a third response sent at a second time from the first radio over the second channel;
receiving a fourth response sent at the second time from the second radio over the first channel; and
updating the location of the client device, based on a third time of flight for receiving the third response from the first radio and a fourth time of flight for receiving the fourth response from the second radio.

5. The method of claim 1, wherein the client device is not associated with a network provided by the first radio and the second radio, and wherein the client device receives the second response from the second radio in response to the network determining to send a training signal.

6. The method of claim 1, wherein the client device is associated with a network provided by the first radio and the second radio as a guest, and wherein the client device receives the second response from the second radio in response to the network determining to send a training signal.

7. The method of claim 1, wherein the first channel and the second channel are selected at least in part based on:
the first radio and the second radio having line of sight to the client device; and
the first channel and the second channel satisfying an interference similarity threshold.

8. A method, comprising:
sending, from a client device, a single ranging request to a first radio;
receiving, at the client device, a first response associated with the single ranging request that is sent at a first time from the first radio over a first channel;
receiving, at the client device, a second response associated with the single ranging response sent at the first time from a second radio over a different channel based on the single ranging request;
calculating a first time of flight for receiving the first response from the first radio;
calculating a second time of flight for receiving the second response from the second radio;
calculating, based on the first time of flight and the second time of flight, a location of the client device relative to the first radio and to the second radio.

9. The method of claim 8, further comprising:
receiving a third response associated with the single ranging request that is sent at a second time from the first radio over the second channel;
receiving a fourth response associated with the single ranging request that is sent at the second time from the second radio over the first channel; and
updating the location of the client device, based on a third time of flight for receiving the third response from the first radio and a fourth time of flight for receiving the fourth response from the second radio.

10. The method of claim 8, wherein:
the first radio and the second radio provide a wireless network;
the client device is not associated with the wireless network; and
the client device receives the second response from the second radio on the second channel in response to the network determining to send a training signal to the client device when networking conditions otherwise indicate that the wireless network should provide non-multilink ranging responses on a single channel.

11. The method of claim 8, wherein:
the first radio and the second radio provide a wireless network;
the client device is associated with the wireless network as a guest; and
the client device receives the second response from the second radio on the second channel in response to the network determining to send a training signal to the client device when networking conditions otherwise indicate that the wireless network should provide non-multilink ranging responses on a single channel.

12. The method of claim 8, wherein the first channel and the second channel are selected at least in part based on:
the first radio and the second radio both having line of sight to the client device; and
the first channel and the second channel satisfying an interference similarity threshold to one another.

13. The method of claim 8, further comprising:
sending a second ranging request from the client device to the first radio and the second radio;
receiving a first ranging signal sent from the first radio via the first channel;
receiving a second ranging signal sent from the second radio via the second channel, wherein the first radio and the second radio are coordinated to send the first ranging signal and the second ranging signal simultaneously at a second time; and
determining, based on a third time of flight of the first ranging signal from the first AP to the client device and a fourth time of flight of the second ranging signal from the second AP to the client device, an updated location of the client device.

14. The method of claim 8, wherein the client device is associated with the first radio and is not associated with the second radio in a wireless network basic service set.

\* \* \* \* \*

UNITED STATES PATENT AND TRADEMARK OFFICE
CERTIFICATE OF CORRECTION

| | |
|---|---|
| PATENT NO. | : 11,129,125 B1 |
| APPLICATION NO. | : 16/812004 |
| DATED | : September 21, 2021 |
| INVENTOR(S) | : Jerome Henry et al. |

It is certified that error appears in the above-identified patent and that said Letters Patent is hereby corrected as shown below:

On the Title Page

In item (74), in Column 2, in "Attorney, Agent, or Firm", Line 1, delete "Shendan," and insert -- Sheridan, --, therefor.

In item (57), in Column 2, in "Abstract", Line 13, after "channel" insert -- and --.

In the Specification

In Column 3, Line 6, delete "(loT)" and insert -- (IoT) --, therefor.

In Column 8, Line 3, delete "time" and insert -- time. --, therefor.

In Column 8, Line 38, delete "timet" and insert -- $time_2$ --, therefor.

Signed and Sealed this
Fourth Day of January, 2022

Drew Hirshfeld
*Performing the Functions and Duties of the
Under Secretary of Commerce for Intellectual Property and
Director of the United States Patent and Trademark Office*